Figure 1:
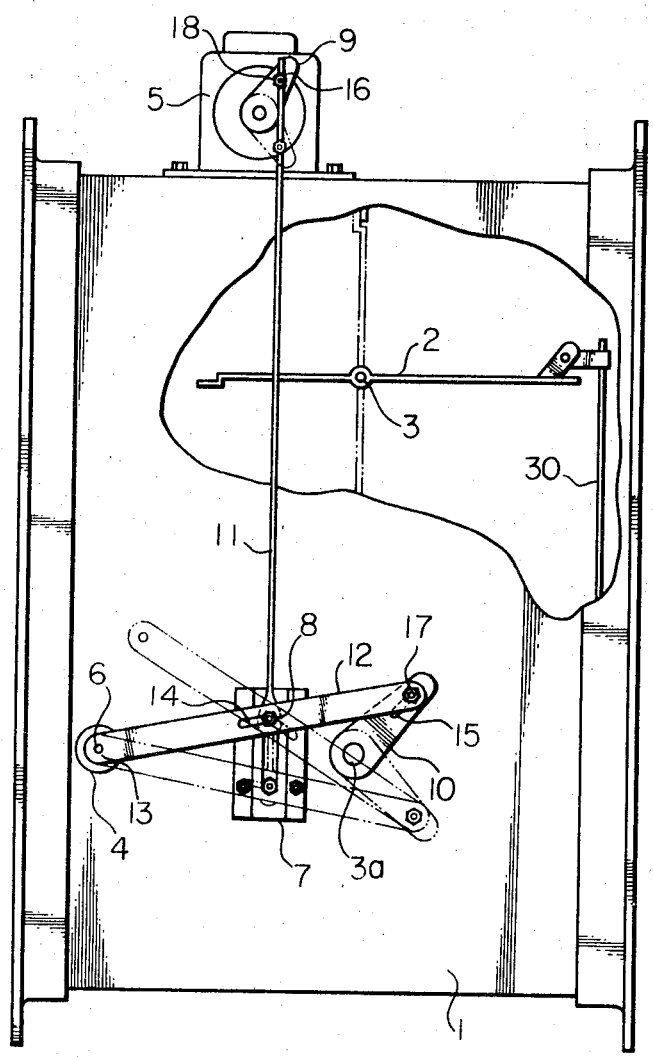

United States Patent
Mochida

[15] 3,643,582
[45] Feb. 22, 1972

[54] SAFETY MECHANISM FOR A FLOW CONDUIT DAMPER

[72] Inventor: Hisashi Mochida, Osaka, Japan
[73] Assignee: Daito Mfg. Co., Ltd., Osaka, Japan
[22] Filed: June 4, 1970
[21] Appl. No.: 43,423

[30] Foreign Application Priority Data
June 6, 1969 Japan..................................44/53068

[52] U.S. Cl..................................................98/86
[51] Int. Cl.................................................F23l 17/02
[58] Field of Search...................................98/86; 126/287.5

[56] References Cited
UNITED STATES PATENTS

| | | | |
|---|---|---|---|
| 1,100,003 | 6/1914 | Watson | 98/86 X |
| 1,125,416 | 1/1915 | Watson | 126/287.5 |
| 1,788,556 | 1/1931 | Wood | 98/94 |
| 2,190,992 | 2/1940 | Swepston | 126/287.5 |
| 2,242,738 | 5/1941 | Alton | 126/287.5 |

Primary Examiner—Edward J. Michael
Attorney—Milton J. Wayne

[57] ABSTRACT

An additional safety mechanism of a fuse melt type applied to a damper arrangement for controlling a temperature condition of an objective circumstance such as air in a room by adjusting a flow rate of a heat medium through a conduit duct upon detection of the temperature for effecting instant intercepting of the flow path upon detection of an abnormal overheated medium's passing in a manner independent from the flow rate controlling action.

7 Claims, 3 Drawing Figures

SAFETY MECHANISM FOR A FLOW CONDUIT DAMPER

The present invention relates to an additional safety mechanism of a damper arrangement of a flow conduit, more particularly relates to a safety mechanism attached to a damper arrangement of a flow conduit for controlling a temperature condition of a objective circumstance by adjusting a flow rate and capable of intercepting the flow path through the conduit upon detection of overheating of the flow, in a manner independent from the flow rate controlling action.

It is known that the conventional damper arrangement for controlling the air temperature condition or the like in an automatic manner is equipped with an electric controlling unit for adjusting a heat medium flow passing through a conduit duct by effecting a change of an opening magnitude of the damper in reference to the temperature condition of the air in the room or the like, which is heated by the heat medium. In the conventional mechanism, the pivoting of the damper is effected and controlled by the operating motor provided with control elements such as a thermostat and controlling panel or relay. The operating motor is operable upon a damper shaft upon instruction from the panel through a thermostat exposed to the air in the room in an arrangement that a crank arm of an operating motor is linked directly with the damper arm by a least one connecting rod. However, when the temperature of the heat medium passing through the conduit escalates in a short time in an abnormally high state independent of the room air temperature, the process control arrangement generally cannot be expected to perform a closing of the damper for intercepting the abnormal high medium flow rapidly. Such malfunction in the flow rate control action tends to result in a serious accident such as a fire, so that usually, means such as a fuse for switching off the electric power source of the heater upon flowing of an overload current is arranged with the electric circuit of the control system in a well-known manner. However, the extraordinary escalation in the temperature of the heat medium flow requires an instant interception of the flow path for preventing the fire more effectively.

So, for sake of safety, a safety mechanism for instant intercepting of the flow path before gradual interception of the flow path effected from the flow rate controlling action upon overheating of the heat flow medium is desired in addition to switching off the electric power source of the heater.

The object of the present invention is to provide an additional safety mechanism for intercepting the flow path instantly through the conduit upon detection of overheating of the heat flow medium in a manner independent from the flow rate controlling action.

The fuse melt type mechanism in accordance with the present invention is applied to a butterfly damper arrangement for controlling a flow rate of a heat medium through a duct, having a damper shaft extending into a duct through a duct wall in an axially pivotal disposition, a damper arm radially extending outside of the duct from the damper shaft, an operating motor, having a crank arm mounted on the duct and provided with control elements for an air conditioning or the like, and a connecting rod for linking the crank arm to the damper arm.

The safety mechanism has means for urging said damper shaft towards a pivotal angular position for closing said damper, such as a dead weight. A fuse is provided, one end of which is secured to a terminal of an internal extension from the duct wall. The fuse is exposed to the heat medium flow through the duct. A rod of a stepped form is provided and elongated within the internal extension through the duct wall. The rod at one end is mounted on a free end of the fuse.

Means for urging the rod towards the fuse upon melting of the fuse exposed to an abnormal overheated medium flow is provided. On the duct wall, a groove is formed to couple a sliding member in an engaged arrangement. The sliding member is articulated to one end of the connecting rod. Another end of the connecting rod is also hinged to the crank arm of the operating motor. A lever, at one end, is engaged to free end of the rod over the duct wall in an arrangement detachable to and pivotable about the rod. The lever is linked to the damper arm and the sliding member in an arrangement that the lever is pivotable in respect to the sliding member which is in any position within a predetermined range in a case of a disengaged state from the rod and further, is pivotable in respect to the rod, accordingly as the sliding member is removed along the groove in a case of an engaged state with the rod.

Figure 2:
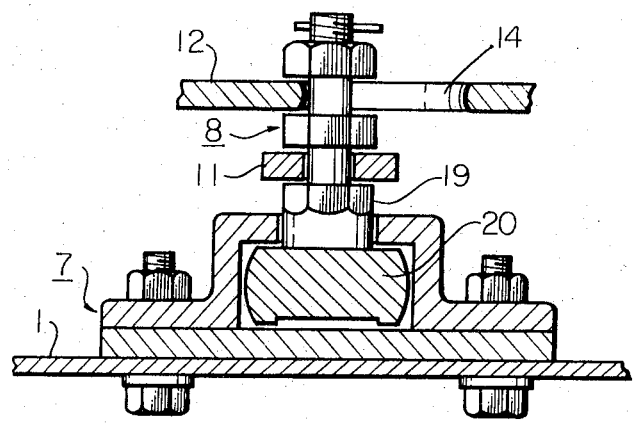
Figure 3:
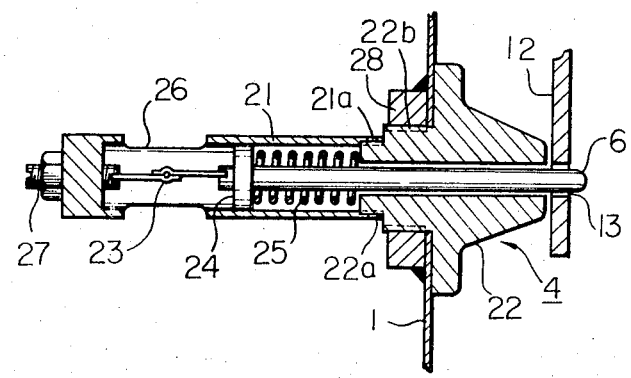

The present invention is further described, by way of example, with reference to the accompanying drawings, in which;

FIG. 1 is a side elevation, partly broken away, of the damper arrangement provided with the safety mechanism according to the present invention, FIG. 2 is an enlarged cross-sectional view of the guiding body and the sliding member linked to the lever and the connecting rod shown in FIG. 1, FIG. 3 is an enlarged longitudinal-sectional view of the fuse melt type closing unit applied to the mechanism of the present invention.

Referring to FIG. 1, a damper frame 1, which is encircled by the sidewall is provided with a transverse cross-sectional profile compatible with a transverse cross-sectional profile of the duct and is to be disposed in an arrangement transversing the duct. Double dampers 2 are pivotally disposed to the sidewall of the damper frame 1 in an arrangement axially mounted onto each damper shaft 3 elongated through the wall and are connected by a rod 30 so as to pivot simultaneously.

The damper shaft 3 is urged towards a pivotal angular position corresponding to a closing of the damper 2 in a disposition operable on the damper shaft 3 by a dead weight disposed to the damper 2 or a helical spring encircling the damper shaft, one end of which is stationary to the sidewall of the damper frame 1 and another end of which is fixed to the damper shaft 3.

A damper arm 10 is secured to an outside extension 3a of one of the damper shafts 3 which is in a lower position, extending radially from the extension 3a. A fuse melt-type closing unit 4 is threaded into the sidewall of the damper frame 1 in an arrangement so as not to bar a pivoting of the damper.

Referring to FIG. 3, the closing unit 4 comprises a unit body 21 of annular form, a unit head 22 having an axial bore threaded thereinto, a fusing member 23, a compression spring 25 and a rod 6 extending axially. The head portion 22 is connectable to the unit body 21 by their respective threaded end portions 22a and 21a, and further is connectable to a nut element 28 fixed on the inside of the damper frame 1 by its other threaded portion 22b. The unit body 21 is provided with a pair of openings 26 formed at a portion to be inside the damper frame 1 and the damper frame side end of the unit body 21 is provided with an adjusting bolt 27 threaded thereinto.

At the location of the openings 26, the fusing member 23, which is composed of a pair of partially superposed plates and fixed to each other by a fusable material, is secured to a groove formed to an outer end of the adjusting bolt 27 in a detachable arrangement. The inner end of the fusing member 23 is detachably disposed to a groove formed on one end of the rod 6. The rod 6, which is connected to the adjusting bolt 27 by the fusing member 23, is contained within the unit body 21 in a pivotal and slidable condition in an arrangement that the compression spring 25 encircling the rod 6 is sandwiched by the inner end of the unit head 22 and an enlarged portion 24 formed near the fuse side end of the rod 6.

The free end of the rod 6 is projected slidably outside of the unit head 22 through the bore of the unit head. In the arrangement of the closing unit 4, upon melting of the fusable material at a predetermined temperature, the fusing member 23 is separated into two plates and then the restriction applied onto the compression spring 25 is cancelled. The enlarged portion 24 of the rod 6 is thus urged so as to draw the rod 6 towards the fusing member 23 by the expansion of the compression spring 25. In a normal state of the unit 4, the projecting end of the rod 6 from the unit head 22 is connected to a lever 12 through a hole formed at one end thereof in a detachable arrangement.

The lever 12 is, at its other end, linked to the damper arm 10 through a hinged joint, which joint is formed by a circular hole on the other end of the lever 12, a longitudinal slot 15 and a bolt-nut joint 17. In the linkage arrangement, the damper arm 10 pivots in respect to the axis of the damper shaft 3 together with the lever 12 during a pivotal motion of the lever 12 about the rod 6 of the closing unit 4 clockwise or counterclockwise. Also during the pivotal motion, the double damper 2 pivots together with the damper arm 10.

A guiding body 7 is attached to the sidewall of the damper frame 1 in a position between the closing unit 4 and the outside extension 3a of the damper shaft 3.

Referring to FIG. 2, a sliding member 8, which comprises a sliding portion 20 and a horizontal extension 19 of a stepped form, is coupled to the guiding body 7 in a vertical groove formed therein in an arrangement wherein the sliding portion 20 is vertically engageable and slidable up or down in the groove.

The horizontal extension 19 of the sliding member 8 is projected through the groove of the guiding body 7. The lever 12 is linked to the sliding member 8 by the horizontal extension 19 through a longitudinal slot 14 thereof in a disposition that the lever 12 is slidable in the slot 14 longitudinally and pivotable about the extension 19. Further, the horizontal extension 19 of the sliding member 8 is linked to a connecting rod 11 through a hole formed in one end thereof. In the linking arrangement of the lever 12 and the connecting rod 11 to the horizontal extension 19 of the sliding member 8, the lever 12 is mounted on a lower axial portion of the extension 19 and the connecting rod 11 on an upper axial portion which is spaced apart from the former as shown in FIG. 2.

Mounted on the top wall of the damper frame 1 is an operating motor 5, such as a Modutrol motor, to be applied to a servomechanism, which is actuated by an instruction from an operating panel or a relay, in reference to the temperature condition of the room or the like detected by a thermostat which is arranged in the room. A crank arm 9 which extends radially from an outside extension of the motor shaft is articulated to the other end of the connecting rod 11 by a ball joint 18.

In the arrangement of the crank arm 9, the connecting rod 11 and the sliding member 8 within the guiding body 7, a pivotal motion of he crank arm 9 is changed to a vertical straight motion of the sliding member 8 by the connecting rod 11 and the guiding body 7 leading the sliding member 8 along the vertical groove thereof. The clockwise motion of the crank arm 9 thus corresponds to the elevating motion of the sliding member 8. During the straight motion of the sliding member 8, the lever 12 is simultaneously urged by the sliding member so as to pivot about the projecting end of the rod 6 in the closing unit 4, so that the damper arm 10 effects a pivoting together with the lever 12 in the above-described manner.

The lower damper, which forms one body with the damper arm 10 through the damper shaft, thus pivots according to the pivoting of the crank arm 9.

Therefore, the mechanism of the present invention serves a function of controlling the air condition, identical to that of the conventional mechanism, which functions in the arrangement that, in most cases, the crank arm of the operating motor is linked directly with the damper arm by one or a plurality of connecting rods. Otherwise, the pivoting of the damper is effected and adjusted for controlling the flow rate by the operating motor 5 provided with the control elements so as to maintain the air temperature in the room at a desirable level.

In the mechanism in accordance with the present invention, the magnitude of the opening of the damper 2 or the angular position of the damper 2 is thus settled by the angular position of the crank arm 9 of the operating motor 5. The crank arm 9 always bears against the urging force towards the pivotal angular position for closing the damper 2, but is maintained in a stationary angular position until the operating motor 5 receives a new instruction for actuating the crank arm 9 from the control elements.

Therefore, according to the angular position of the crank arm 9, the dampers 2, the lever 12, the sliding member 8 and the damper arm 10 respectively, are maintained in corresponding positions.

FIG. 1 shows the respective positions of the crank arm 9, the connecting rod 11, the sliding member 8, the lever 12 and the damper arm 10 corresponding to the full opened position of the dampers 2 by solid lines. Also shown in FIG. 1 is the respective positions of these corresponding to the complete closed position of the dampers 2 by the dotted figures.

Upon passing of an overheated medium flow through the duct, the fusing member 23 of the closing unit 4 is melted and then the rod 6 is withdrawn towards the fusing member, that is, into the damper frame 1 by the expansion of the compression spring 25 in the above-described manner. By this withdrawal of the rod 6, the connection between the projecting end of the rod 6 and the lever 12 is cancelled. Upon this cancellation of the connection, the lower damper which is urged by the helical spring or the dead weight so as to pivot to the angular location corresponding to the complete closing of the dampers, performs an instant pivoting together with the damper arm 10. Simultaneously, the lever 12 is swung up at the released end of the lever 12 and the linking end of the lever 12 is withdrawn by the damper arm 10 in a disposition such that the lever 12 pivots about the sliding member 8 which is in the stationary state, sliding longitudinally in respect to the sliding member 8 through the longitudinal slot 14 of the lever 12.

The dotted lines of the lever 12 which is swung up, the damper arm 10 which is swung down and the upper damper 2 which is swung down shows respective positions corresponding to a complete closing of the dampers upon melting of the fusing member 23 of the closing unit 4, particularly in a case of instant change from the full opening position of the damper.

The mechanism of the present invention thus performs a flow rate controlling action while the lever 12 is engaged with the rod 6 of the fuse melt type closing unit 4, and also an instant interception of the flow path when the overheated medium flows through the duct.

What is claimed is:

1. In a butterfly damper arrangement for controlling a flow rate of a heat medium through a duct, comprising a damper shaft extending into said duct through a duct wall in an axially pivotal disposition, a damper arm radially extending outside said duct from said damper shaft, an operating motor having a crank arm and a connecting rod for linking said crank arm to said damper arm, a safety mechanism, comprising, in combination; means for urging said damper shaft towards a pivotal angular position for closing said damper; a fuse, one end of which is secured to an internal extension of a stepped form from said duct wall with said fuse being exposed to said medium flow; a rod of a stepped form, slidably elongated within said internal extension through said duct wall, one end of which is mounted on a free end of said fuse; means for urging said rod towards said fuse upon melting of said fuse; a sliding member, coupled in a groove formed on said duct wall in an arrangement engaging to said groove hinged to one end of said connecting rod which is, at another end, hinged to said crank arm of said operating motor; and a lever, one end of which is engaged to a free end of said rod in an arrangement detachable to and pivotable about said rod, said lever being linked to said damper arm and said sliding member in an arrangement that said lever is pivotable in respect to said sliding member which is in any position within a predetermined range in a case of a disengaged state from said rod, and further, is pivotable in respect to said rod, accordingly as said sliding member is removed along said groove, in a case of an engaged state with said rod.

2. A safety mechanism claimed in claim 1, wherein another end of said lever is linked to said damper.

3. A safety mechanism claimed in claim 1, wherein said groove is of a vertical form in an arrangement that said sliding member is guided to a vertical direction.

4. A safety mechanism claimed in claim 2, wherein said lever is linked to said sliding member through a hinged joint, which joint is formed by a horizontal extension from said sliding member and a longitudinal slot formed in said lever and said lever is linked to said damper arm through a hinged joint, which joint is formed by a horizontal extension from said lever and a longitudinal slot formed in said damper arm.

5. A safety mechanism claimed in claim 1, wherein said internal extension of said duct wall has threaded means formed thereon so that it is detachable from said duct wall.

6. A safety mechanism claimed in claim 1, wherein said urging means of said rod is a compression spring sandwiched between said internal extension of said duct wall which encircles said rod and an enlarged portion of said rod.

7. A safety mechanism claimed in claim 4, wherein said horizontal extension from said damper arm includes a bolt-nut joint so that it is detachable therefrom.

* * * * *